United States Patent
Furue

(10) Patent No.: US 6,960,778 B2
(45) Date of Patent: Nov. 1, 2005

(54) RADIATION IMAGE INFORMATION READING RECORDING APPARATUS

(75) Inventor: Ryosuke Furue, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/986,410

(22) Filed: Nov. 8, 2001

(65) Prior Publication Data

US 2002/0056817 A1    May 16, 2002

(30) Foreign Application Priority Data

Nov. 8, 2000    (JP) .............................. 2000-340233

(51) Int. Cl.⁷ .............................................. G03B 42/08
(52) U.S. Cl. ..................................... 250/584; 250/588
(58) Field of Search .............................. 250/584, 585, 250/586, 588, 484.1

(56) References Cited

U.S. PATENT DOCUMENTS

| | | | |
|---|---|---|---|
| 4,258,264 A | 3/1981 | Kotera et al. | |
| 4,276,473 A | 6/1981 | Kato et al. | |
| 4,387,428 A | 6/1983 | Ishida et al. | |
| 4,816,679 A | 3/1989 | Sunagawa et al. | |
| 4,849,631 A * | 7/1989 | Ono ........................ | 250/590 |
| 4,851,679 A | 7/1989 | Tamura et al. | |
| 4,922,103 A | 5/1990 | Kawajiri et al. | |
| 5,151,604 A * | 9/1992 | Kohda et al. ............. | 250/484.4 |
| 5,381,017 A * | 1/1995 | Ohta ........................ | 250/484.4 |
| 5,874,744 A * | 2/1999 | Goodman et al. ......... | 250/584 |
| 6,373,074 B1 * | 4/2002 | Mueller et al. ........... | 250/584 |

FOREIGN PATENT DOCUMENTS

| | | | |
|---|---|---|---|
| JP | 55-12429 | 1/1980 | ............ G01T 1/10 |
| JP | 55-116340 | 9/1980 | ............ A61B 6/00 |
| JP | 56-104645 | 8/1981 | ............ A61B 6/00 |
| JP | 59-192240 | 10/1984 | .......... G03B 41/16 |
| JP | 60-111568 | 6/1985 | ............ H04N 1/04 |
| JP | 60-236354 | 11/1985 | ............ H04N 1/04 |
| JP | 63-131134 | 6/1988 | .......... G03B 42/02 |
| JP | 1-101540 | 4/1989 | .......... G03B 42/02 |

* cited by examiner

Primary Examiner—Albert Gagliardi
(74) Attorney, Agent, or Firm—Sughrue Mion, PLLC

(57) ABSTRACT

A radiation image information recording/reading apparatus for detecting phosphorescent light from a side opposite of radiation irradiation on a stimulable phosphor sheet is downsized. The radiation image information recording/reading apparatus comprises an image recording unit for recording radiation image information on the sheet by irradiating the radiation representing image information on the sheet, an excitation light main scan means for main scan of the sheet by excitation light, photoelectric detection means for detecting the phosphorescent light emitted from the sheet, vertical scan means, and erasing means for releasing residual energy from the sheet prior to recording another image on the sheet after reading the information from the sheet. In the apparatus, the excitation light main scan means comprises a linear light source emitting the excitation light in the form of fan beams, and the photoelectric detection means comprises a line sensor.

7 Claims, 7 Drawing Sheets

F I G . 1
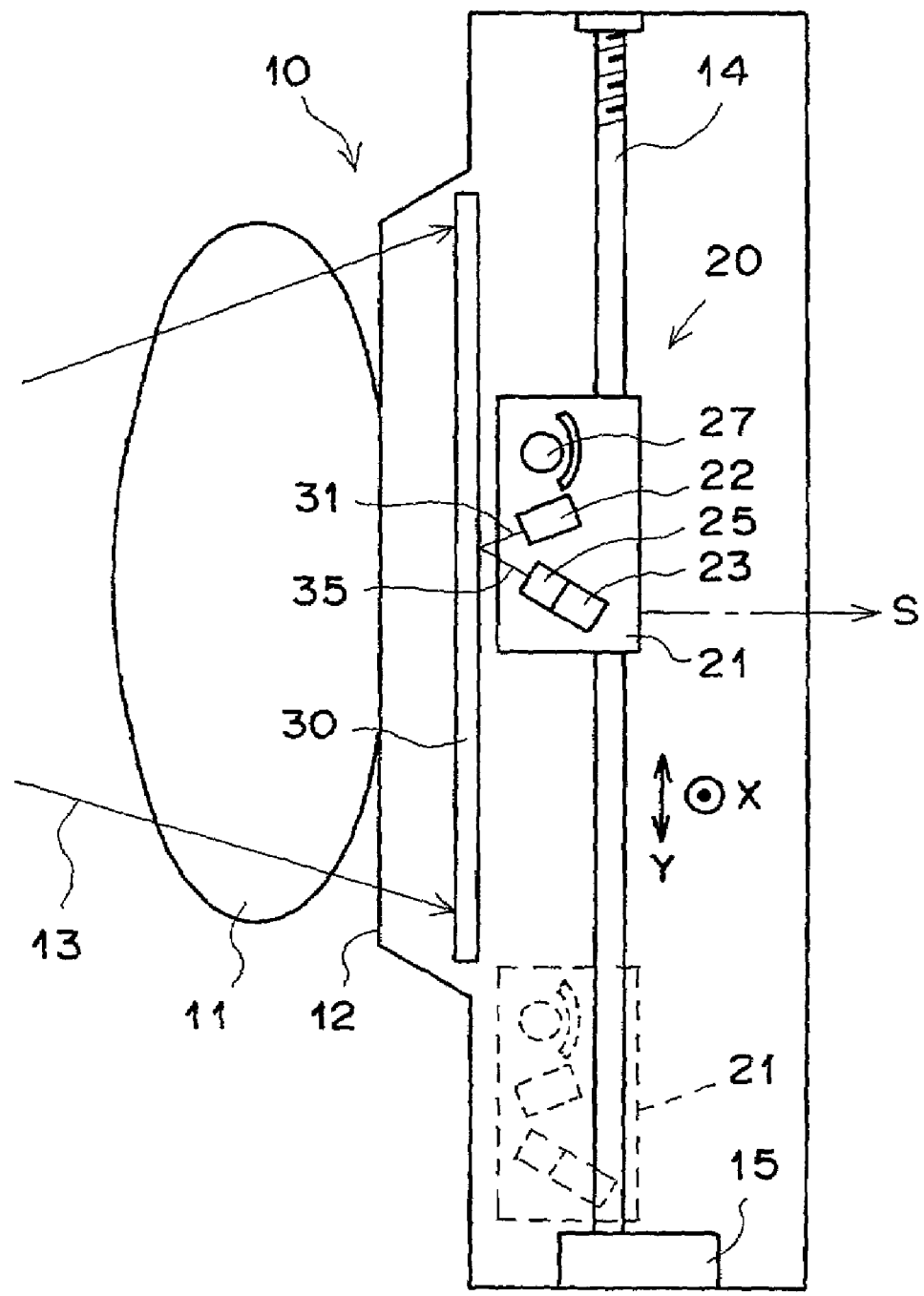

F I G . 3
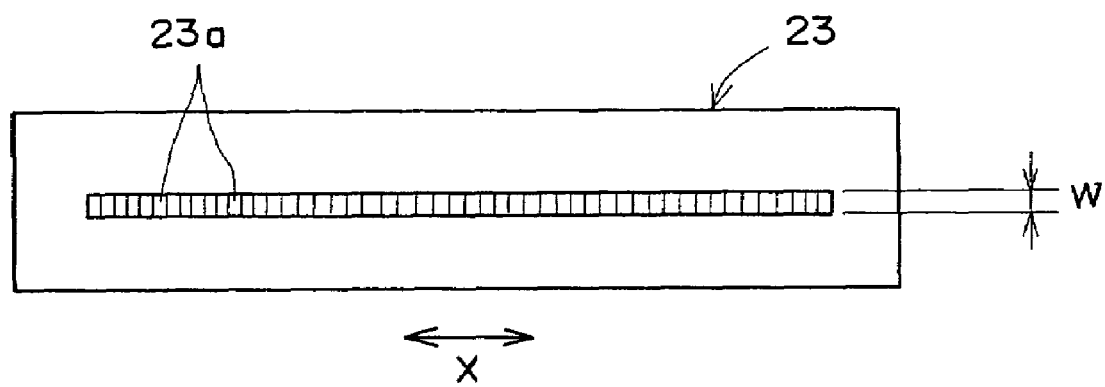

RADIATION IMAGE INFORMATION READING RECORDING APPARATUS

BACKGROUND OF THE INVENTION

1. Field of the Invention

The present invention relates to a radiation image information recording/reading apparatus for recording radiation image information in a stimulable phosphor sheet and for obtaining an image signal representing the radiation image information by photoelectrically reading light emitted from the sheet upon exposure of the sheet to excitation light.

2. Description of the Related Art

Radiation image recording reproducing systems using stimulable phosphor sheets have been widely put into practice. Stimulable phosphor stores a portion of energy of radiation irradiated thereon and emits light in accordance with the stored radiation energy upon exposure to an excitation light such as visible light or a laser beam. A stimulable phosphor sheet includes such stimulable phosphor covering a substrate.

In such a radiation image recording reproducing system, radiation that has passed through a subject such as a human body is irradiated on a stimulable phosphor sheet to record radiation image information of the subject in the sheet. Thereafter, the sheet is scanned two-dimensionally with an excitation light such as a laser beam to cause the sheet to emit light from an area on which the excitation light has been irradiated, and obtains an image signal representing the radiation image information by reading the light with photoelectric reading means (see Japanese Unexamined Patent Publication Nos. 55(1980)-12429, 55(1980)-116340 and 56(1981)-104645, for example).

The image signal obtained by the system is subjected to image processing such as tone processing and frequency processing appropriate for observing an image represented by the image signal. The image is reproduced as a visible image on a film, or displayed on a CRT image display device for diagnosis. The stimulable phosphor sheet after reading the radiation image information can be used repeatedly to store radiation image information if erasing light is irradiated thereon to release residual energy from the sheet.

Furthermore, radiation image information recording/reading apparatus taking advantage of reusability of stimulable phosphor sheets have also been in wide use (see Japanese Unexamined Patent Publication Nos. 59(1984)-192240 and 63(1988)-131134, for example). In such an apparatus, radiation image information is recorded in a stimulable phosphor sheet and read therefrom, the stimulable phosphor sheet being used repeatedly.

Such a radiation image information recording/reading apparatus basically comprises:

an image recording unit for recording radiation image information in a stimulable phosphor sheet by irradiating radiation representing the radiation image information on the sheet;

excitation light main scan means for carrying out main scan of the sheet having the radiation image information therein with excitation light irradiated from a side opposite a side of irradiation of the radiation;

vertical scan means for relatively moving either the sheet or the main scan means to the other in a direction crossing a direction of the main scan;

photoelectric detection means for detecting light emitted from an area in the sheet on which the excitation light has been irradiated, from a side of irradiation of the excitation light and from a side opposite of the excitation light irradiation; and erasing means for releasing residual radiation energy from the sheet after reading the light, prior to recording of another image in the sheet by the image recording unit.

The stimulable phosphor sheet may be subjected to the radiation image information reading while staying in a position where the radiation image information has been recorded on the sheet (that is, the excitation light irradiation and the detection of the light are carried out at the same position), or may be conveyed by conveyor means to an image reading unit of the apparatus comprising the photoelectric detection means and the like for the radiation image information reading after the radiation image information has been recorded in the sheet.

A sheet having high rigidity and thus practically inflexible may be used as the stimulable phosphor sheet. This stimulable phosphor sheet of so-called rigid type has the advantage that it does not need to be conveyed by sheet conveyor means such as an endless belt and can be moved directly, unlike a stimulable phosphor sheet having flexibility.

In the radiation image information recording/reading apparatus described above, the excitation light irradiation and the detection of the light being performed from a side opposite a side of the radiation irradiation has been proposed for the sake of downsizing of the apparatus, especially in the case where the stimulable phosphor sheet of rigid type is fixed in a photographing position where the sheet is also read for the radiation image information.

However, even if such a configuration is adopted, a conventional radiation image information recording/reading apparatus uses raster scan means for two-dimensional scan of the stimulable phosphor sheet by using a light beam deflected by a light deflector. Furthermore, photomultipliers are used as the photoelectric detection means in the apparatus. Therefore, downsizing has been difficult.

SUMMARY OF THE INVENTION

The present invention has been conceived based on consideration of the above problem. An object of the present invention is therefore to sufficiently downsize a radiation image information recording/reading apparatus for irradiating excitation light and detecting light from a side opposite of a side of radiation irradiation.

A radiation image information recording/reading apparatus of the present invention comprises the image recording unit, the excitation light main scan means, the vertical scan means, the photoelectric detection means, and the erasing means as has been described above, and the irradiation of the excitation light and the detection of the light in the image reading unit are carried out on a side opposite of a side of the irradiation of the radiation. The radiation image information recording/reading apparatus of the present invention is characterized by the stimulating-ray main scan means comprising a linear light source such as a semiconductor laser array and an LED array for emitting the excitation light in the form of fan beams, and the photoelectric detection means comprising a line sensor.

It is preferable for the radiation image information recording/reading apparatus of the present invention to use a stimulable phosphor sheet having a stimulable phosphor layer and a reflection layer for reflecting the phosphorescent light so that the stimulable phosphor sheet can be scanned with the excitation light in a state where the stimulable phosphor layer is located closer to the stimulating-ray main scan means and the reflection layer is located farther from the main scan means.

As the stimulable phosphor sheet, an anisotropic stimulable phosphor sheet restricting spread of the excitation light and/or the phosphorescent light in the sheet can be used preferably. As the anisotropic stimulable phosphor sheet, a stimulable phosphor sheet having a plurality of minute cells divided by a reflective partitioning material extended in a direction of thickness of the sheet for reflecting the light maybe used. Alternatively, a stimulable phosphor sheet having columnar crystals may also be used.

It is also preferable for the radiation image information recording/reading apparatus of the present invention to comprise a radiation absorption plate placed close to a surface of the sheet on the side opposite of the radiation irradiation at the time of the radiation irradiation on the sheet and moved away from the sheet after the radiation irradiation.

In the radiation image information recording/reading apparatus of the present invention, the linear light source comprising the excitation light main scan means can be made smaller than raster scan means that scans a sheet by deflecting a light beam. Furthermore, the line sensor comprising the photoelectric detection means can also be made smaller then a photomultiplier or the like. The radiation image information recording/reading apparatus of the present invention can be sufficiently downsized by using the linear light source and the line sensor for the image reading unit.

Moreover, if the stimulable phosphor sheet having the stimulable phosphor layer and the reflection layer for reflecting the light is used for the radiation image information recording/reading apparatus of the present invention and placed in a state where the stimulable phosphor layer is located closer to the excitation light main scan means and the reflecting layer is located farther from the main scan means, the quality of an image read in the above manner can be improved.

In other words, when the stimulable phosphor sheet (that is, the stimulable phosphor layer) is scanned two-dimensionally with the excitation light, the phosphorescent light emitted from a side of the excitation light irradiation is received and detected by the photoelectric detection means, but the phosphorescent light is also emitted to a side opposite of the excitation light irradiation. In the above configuration, the light emitted to the side opposite of the excitation light irradiation is reflected by the reflection layer and can be received and detected by the photoelectric detection means. Therefore, efficiency of the light detection can be improved and the quality of the image represented by a signal output from the photoelectric detection means can become higher.

Meanwhile, if the radiation image information recording/reading apparatus of the present invention uses the anisotropic stimulable phosphor sheet restricting the spread of the excitation light and/or the phosphorescent light within the sheet, the image quality can also be improved.

In other words, if the spread of the excitation light within the sheet is suppressed, a blur in the image due to the phosphorescent light emitted from an area other than a predetermined scanning area caused by the spread of the excitation light can be prevented. Furthermore, if the spread of the phosphorescent light within the sheet is prevented, said light can be lead efficiently to a light reception surface of the line sensor even if the surface is extremely narrow. Therefore, the efficiency in the light detection can be improved and the quality of the image represented by the signal output from the photoelectric detection means can be improved.

Moreover, in the radiation image information recording/reading apparatus of the present invention, if the radiation absorption plate, which is placed close to the surface of the sheet on the opposite side of the radiation irradiation at the time of the radiation irradiation and moved to a position away from the sheet after the irradiation, is used, image quality degradation due to scattered radiation can be prevented.

At the time of recording the radiation image information, the radiation can pass through the sheet. At the same time, the radiation can pass outside of the sheet and enter the apparatus to be scattered by the material of the apparatus. The scattered radiation may reenter the sheet and degrade the image quality. However, if the radiation absorption plate is placed close to the surface of the sheet on the opposite side of the radiation irradiation at the time of the radiation irradiation on the sheet, the scattered radiation is prevented from reentering the sheet and the image quality degradation can be prevented.

The radiation absorption plate can be moved to a position away from the sheet after the radiation irradiation. Therefore, the plate does not interfere with the stimulating-ray main scan means or the photoelectric detection means at the time of reading the radiation image information, and the radiation image information can be read normally.

BRIEF DESCRIPTION OF THE DRAWINGS

FIG. 1 is a side view of a radiation image information recording/reading apparatus of a first embodiment of the present invention;

FIG. 3 is a top view showing a line sensor used in the apparatus in FIG. 1;

DESCRIPTION OF THE PREFERRED EMBODIMENTS

Figure 2:
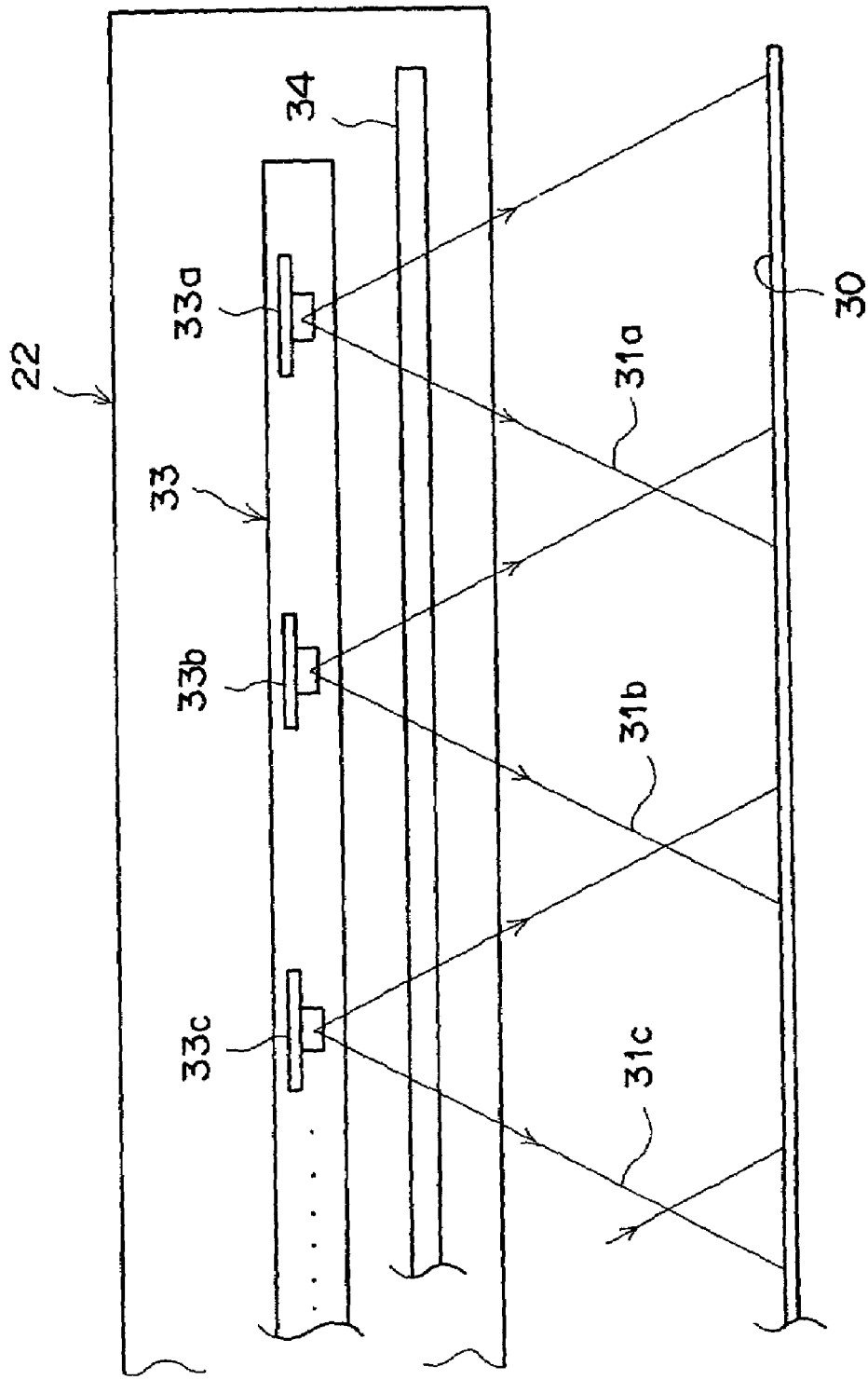
FIG. 2 is a front view showing a linear light source used in the apparatus shown in FIG. 1.

Hereinafter, embodiments of the present invention will be explained with reference to the accompanying drawings. FIG. 1 is a side view of a radiation image information recording/reading apparatus of a first embodiment of the present invention. As shown in FIG. 1, the radiation image information recording/reading apparatus of the first embodiment comprises a radiation image photographing unit 10 and a radiation image information reading unit 20.

The radiation image photographing unit 10 has a photographing table 12 for supporting a subject 11 such as a human body at a predetermined position. A stimulable phosphor sheet 30 is fixed behind the table 12. The stimulable phosphor sheet 30 includes a stimulable phosphor layer formed on a plate-form base material. In this embodiment, the stimulable phosphor sheet is of so-called rigid type and is practically inflexible.

At the time of photographing, the subject 11 is placed at the predetermined position and radiation 13 such as X-rays emitted from a radiation source not shown in FIG. 1 is irradiated on the subject 11. The radiation 13 that has passed through the subject 11 is irradiated on the sheet 30 and radiation image information of the subject 11 is recorded in the sheet 30.

In the radiation image information reading unit 20, a vertical scan unit 21 is used for reading the radiation image information from the sheet 30. The vertical scan unit 21 comprises a linear light source 22, a CCD line sensor 23, a light converging lens array 25 placed in front of the line sensor 23 (on a side of the sheet 30), and a erasing light source 27. The vertical scan unit 21 also comprises a female screw unit (not shown) or the like engaging with a ball screw 14 driven by driving means 15 and elongated in a lengthwise direction thereof. The vertical scan unit 21 moves up and down by revolution of the ball screw in a positive or reverse direction.

The linear light source 22 comprises a laser diode array 33 and a cylindrical lens 34, as shown in the front view of FIG. 2. The laser diode array 33 comprises lined laser diodes 33a, 33b, 33c, . . . each having an oscillation wavelength in a 650~690 nm band. Excitation light 31a, 31b, 31c, . . . emitted divergently from the laser diodes 33a, 33b, 33c . . . are collected by the cylindrical lens 34 in one direction (contained in a plane shown in FIG. 1) to become fan beams, and excitation light 31 composed of the fan beams are linearly irradiated on a portion of the sheet 30 (hereinafter called the irradiation area of the sheet).

The CCD line sensor 23 comprises a plurality of sensor chips (photoelectric conversion devices) 23a lined as shown in FIG. 3. In this example, a light reception width in a direction orthogonal to a direction of the sensor chip arrangement in the CCD sensor 23, that is, a width W of the sensor chips 23a is approximately 100 $\mu$m.

In the CCD line sensor 23, the chip sensors 23a are lined in a direction parallel to a lengthwise direction (a direction shown by X in FIG. 1) of the irradiation area of the sheet 30 shown in FIG. 1. A plurality of the line sensors 23 may also be lined along a lengthwise direction thereof if the sheet 30 has a large width.

Figure 4:
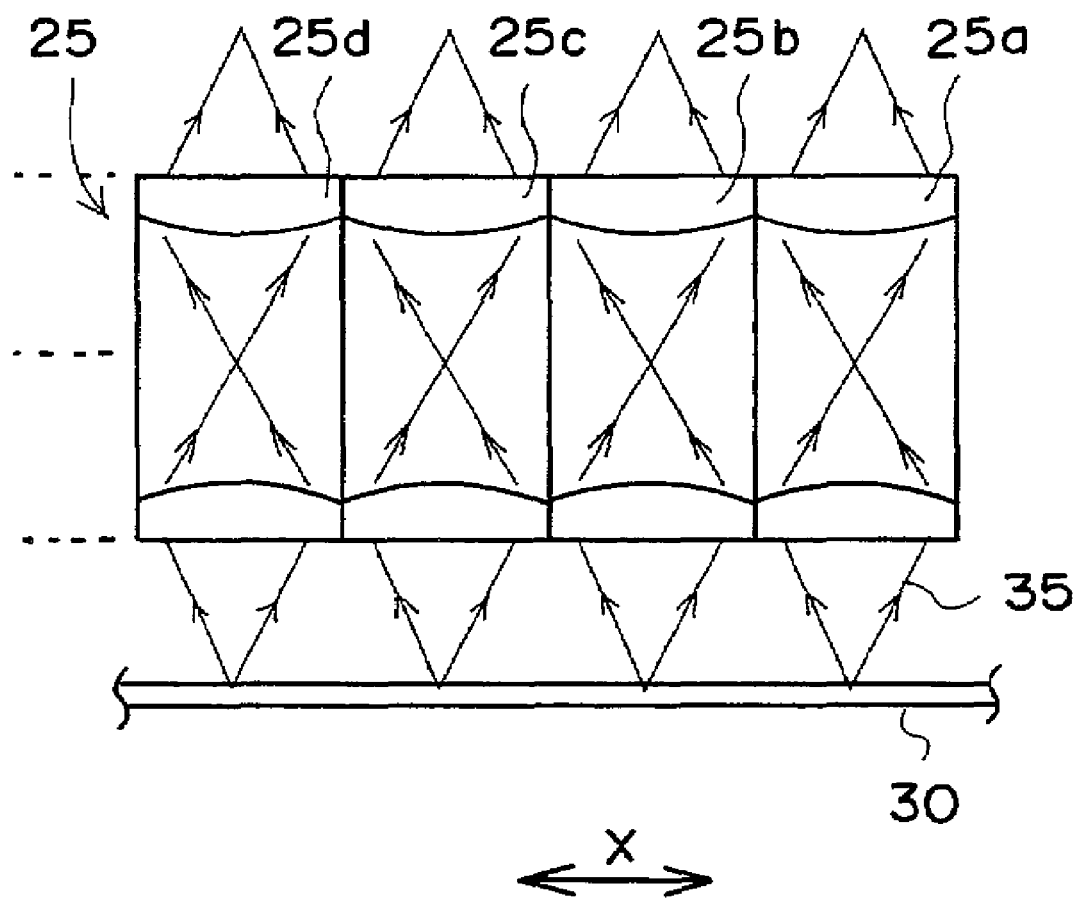
FIG. 4 is a front view of a light converging lens array used in the apparatus in FIG. 1.

Meanwhile, the light converging lens array 25 placed in front of the line sensor 23 comprises a plurality of lenses 25a, 25b, 25c . . . having a continuous refractive-index distribution and arranged to form one line, as shown by ther front view of FIG. 4. The light converging lens array 25 is placed in such a manner that the lenses 25a, 25b, 25c . . . are lined in the X direction of the irradiation area of the sheet 30. Each of the lenses leads phosphorescent light 35 emitted from the sheet 30 to the line sensor 23, as shown in FIG. 1.

A stimulating ray cutting filter (not shown) is also located between the CCD line sensor 23 and the lens array 25, in order to cut the excitation light 31 reflected by the sheet 30.

The erasing light source 27 has a length equal to or longer than the entire width of the sheet 30, and emits erasing light having a wavelength in an excitation wavelength band of the sheet 30.

The vertical scan unit 21 is set in a stand-by position shown by dashed lines in FIG. 1 when the radiation image information is recorded in the sheet 30. After the recording, the vertical scan unit 21 moves upward at a predetermined speed. At this time, the laser diode array 33 in the linear light source 22 is driven and the excitation light 31 in the form of fan beams are irradiated linearly on the irradiation area of the sheet 30 in the X direction for main scan of the sheet 30. At the same time, the vertical scan unit 21 moves to a direction Y orthogonal to the main scan direction and vertically scans the sheet 30 with the excitation light 31. In this manner, the stimulable phosphor sheet 30 is scanned two-dimensionally with the excitation light 31.

The phosphorescent light 35 is emitted from the irradiation area of the sheet 30 in accordance with the radiation image information stored in the irradiation area of the sheet 30. The light 35 is collected by the light converging lens array 25 and enters the CCD line sensor 23 to be received thereby.

A signal output from the CCD line sensor 23 is amplified and subjected to A/D conversion by a reading circuit (not shown) An image signal S obtained in the above manner is output to outside the apparatus and subjected to processing such as tone processing and frequency processing if necessary. The signal is then sent to image display means such as a CRT display device or to an image recording apparatus such as an optical scan recording apparatus. In this manner, an image represented by the image signal S, that is, a radiation image of the subject 11 recorded in the sheet 30 is reproduced.

After the vertical scan unit 21 moves to an ending position of the vertical scan and the reading of the radiation image information is completed, the vertical scan unit 21 is moved downward to the stand-by position. At this time, the erasing light source 27 in the vertical scan unit is turned on and the erasing rays emitted from the source 27 are irradiated on the sheet 30. When the erasing rays in the excitation band are irradiated on the sheet 30, energy of the radiation 13 remaining in the sheet is released.

The erasing rays are irradiated entirely on the surface of the sheet 30 until the vertical scan unit 21 returns to the stand-by position shown by the dashed lines, and the sheet 30 becomes reusable for recording another radiation image.

If the radiation 13 that has passed through the subject 11 is irradiated on the sheet 30 after the vertical scan unit 21 returns to the stand-by position, another radiation image of the subject 11 is recorded again in the sheet 30.

As has been described above, in the radiation image information recording/reading apparatus of the present invention, the excitation light main scan means comprises the linear light source 22 for emitting the excitation light 31 in the form of fan beams, and the photoelectric detection means for detecting the light 35 comprises the CCD line sensor 23. Therefore, the apparatus can be downsized substantially, since the linear light source 22 and the CCD line sensor 23 can be made small.

The linear light source 22 is not limited only to the laser diode array 33, but also an LED array or the like may be used.

Figure 5:
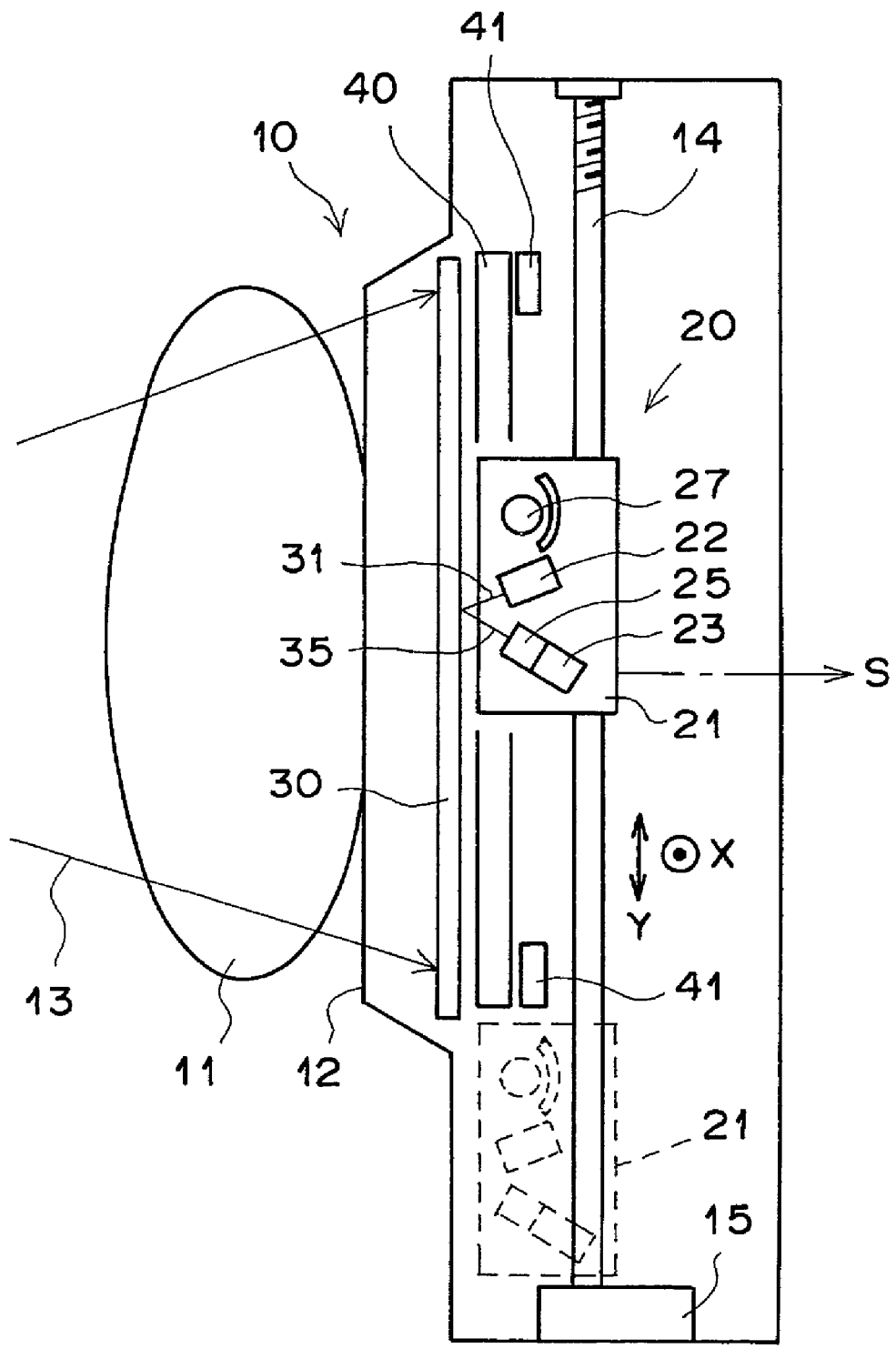
FIG. 5 is a side view of a radiation image information recording/reading apparatus of a second embodiment of the present invention.

A second embodiment of the present invention will be explained next. FIG. 5 is a side view of a radiation image information recording/reading apparatus of the second embodiment of the present invention. In FIG. 5, the same elements as in the first embodiment shown in FIG. 1 have the same reference numbers and detailed explanation thereof is omitted.

In the radiation image information recording/reading apparatus of the second embodiment, a radiation absorption plate 40 made of lead or the like is placed under a stimulable phosphor sheet 30, that is, on a side opposite to a side of radiation irradiation. The radiation absorption plate 40 is placed close to a surface of the sheet 30 at the time of photographing a radiation image, and moved by moving means 41 away from the sheet 30 after the photographing.

In this embodiment, the plate 40 prevents quality degradation in the radiation image due to radiation scattered upon photographing. In other words, at the time of photographing (recording), radiation 13 scatters due to the materials in the apparatus after passing through the sheet 30, and the scattered radiation reenters the sheet 30, causing the image quality degradation. However, if the photographing is carried out in a state where the plate 40 is placed at the above described position, the scattered radiation is prevented from reentering the sheet 30, and the image quality degradation can be avoided.

The radiation absorption plate 40 is moved to the position away from the sheet 30 after irradiation of the radiation 13. Therefore, the radiation absorption plate 40 does not interfere with a vertical scan unit 21 at the time of reading radiation image information, and the radiation image information can be read normally.

Figure 6:
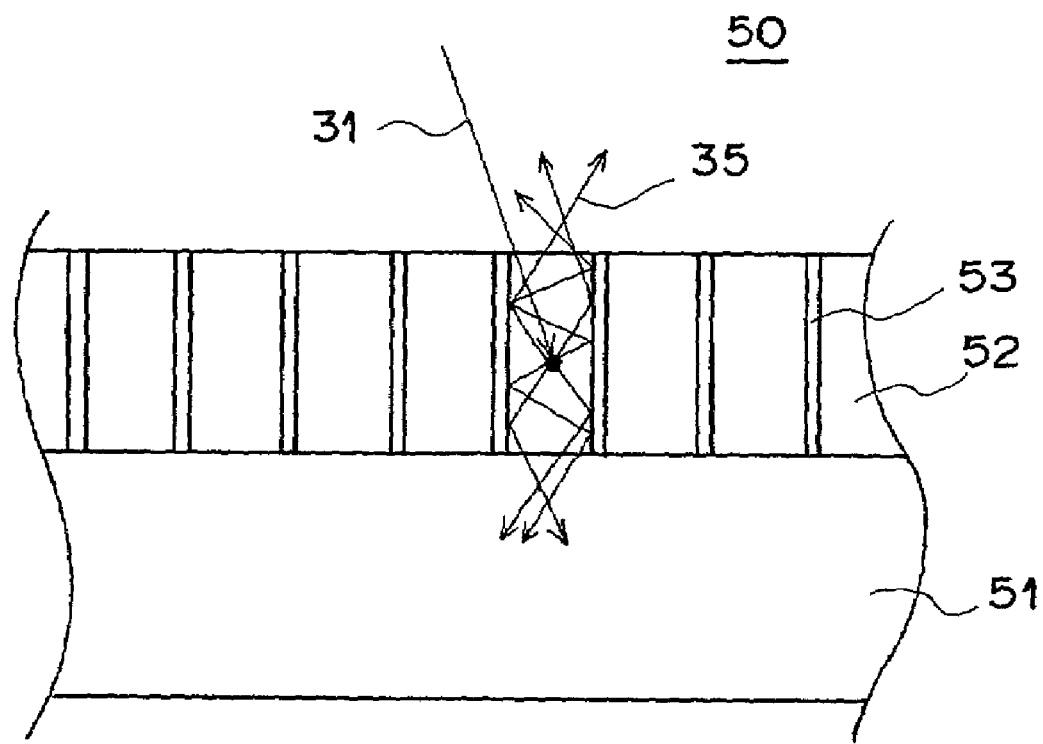
FIG. 6 is a cross-sectional view of a stimulable phosphor sheet used in the radiation image information recording/reading apparatus of the present invention.

In the case where a line sensor having a narrow light reception surface is used as the photoelectric detection means to detect the phosphorescent light 35 as in the first or second embodiment, it is preferable for an anisotropic stimulable phosphor sheet to be used as the sheet 30. FIG. 6 shows a cross-sectional view of an example of such a stimulable phosphor sheet. A stimulable phosphor sheet 50 shown in FIG. 6 has a stimulable phosphor layer 52 formed on a substrate 51. The stimulable phosphor layer 52 is divided in a plurality of minute cells by reflective partitioning material 53 reflecting the light 35 and extending in a direction of thickness of the sheet.

If the stimulable phosphor sheet 50 having the above configuration is used for the apparatus shown in FIG. 1, the light 35 emitted from the irradiation area of the sheet 50 is reflected repeatedly by the reflective partitioning material 53 and propagates toward a front side of the sheet. Therefore, the light 35 does not dissipate within the sheet, that is, in a direction crossing the direction of the thickness. As a result, the light 35 can be led efficiently to the light reception surface of the photoelectric detection means even if the line sensor having the narrow light reception surface is used as the photoelectric detection means. In this manner, efficiency of light detection can be improved and the radiation image can be reproduced in high quality.

As the anisotropic stimulable phosphor sheet, not only the sheet having anisotropy caused by the reflective partitioning material 53 but also a stimulable phosphor sheet having stimulable phosphor of columnar crystal type can be used. In such a stimulable phosphor sheet, columnar crystals are extended in the direction of thickness of the sheet and the light 35 is reflected repeatedly by surfaces of the crystals.

Figure 7:
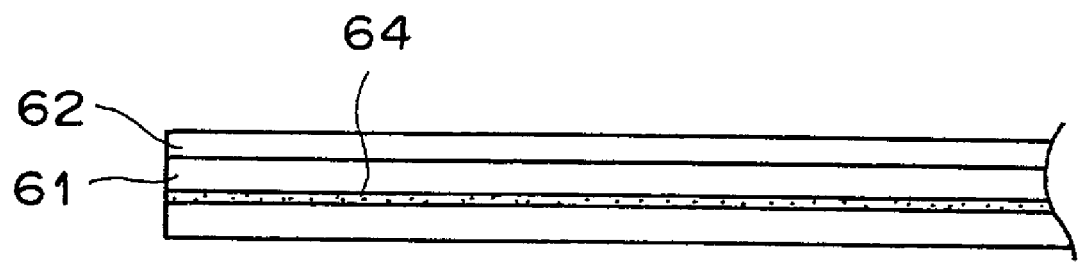
FIG. 7 is a cross-sectional view of another stimulable phosphor sheet used in the radiation image information recording/reading apparatus of the present invention.

Another example of a stimulable phosphor sheet preferably used in the radiation image information recording/reading apparatus of the present invention will be explained with reference to FIG. 7. A stimulable phosphor sheet 60 whose cross section is shown in FIG. 7 comprises a stimulable phosphor layer 62 on one side of a base material 61 and a reflection layer 64 located within the base material 61 for reflecting excitation light and phosphorescent light.

The case of using the sheet 60 in the apparatus shown in 1 will be explained next. The sheet 60 is placed so that the excitation light 31 is irradiated from a side on which the stimulable phosphor layer 62 is located.

When the sheet 60 (that is, the stimulable phosphor layer 62) is two-dimensionally scanned with the excitation light 31, the phosphorescent light 35 spread toward the side of the stimulating ray irradiation is received and detected by the CCD line sensor 23, while the phosphorescent light 35 is also emitted to the side opposite of the irradiation. However, the phosphorescent light 35 emitted from the sheet 60 toward the side opposite of the irradiation is reflected by the reflection layer 64 and returns to the CCD line sensor 23. In this manner, the phosphorescent light is received and detected by the CCD line sensor 23, improving the detection efficiency. As a result, the quality of the radiation image represented by the image signal S is also improved.

The embodiments for reading the radiation image information while fixing the stimulable phosphor sheet at the photographing position have been explained. However, the present invention can be applied to a radiation image information recording/reading apparatus for photographing a radiation image in a stimulable phosphor sheet at a photographing position and for reading radiation image information by moving the sheet to a predetermined reading position. In this case, the same effects as in the above embodiments can be obtained.

What is claimed is:

1. A radiation image information recording/reading apparatus comprising:
   an image recording unit for recording radiation image information in a stimulable phosphor sheet by irradiating radiation representing the radiation image information on the sheet;
   stimulating-ray main scan means for carrying out main scan of the sheet having the radiation image information therein with excitation light irradiated from a side opposite a side of irradiation of the radiation;
   vertical scan means for relatively moving either the stimulable phosphor sheet or the stimulating-ray main scan means to the other in a direction crossing a direction of the main scan;
   photoelectric detection means for detecting phosphorescent light emitted from an area in the sheet on which the excitation light has been irradiated, from a side of irradiation of the excitation light and from a side opposite of the radiation irradiation;
   erasing means for releasing residual radiation energy from the sheet after reading the light, prior to recording of another image in the sheet by the image recording unit;
   a radiation absorption plate placed close to a surface of the sheet on the side opposite of the side of the radiation irradiation at the time of the radiation irradiation on the sheet and moved away from the sheet after the radiation irradiation; and
   a moving device for moving the radiation absorption plate;
   wherein the main scan means comprises a linear light source disposed on only one side of the stimulable phosphor sheet for emitting the excitation light in the form of fan beams, and the photoelectric detection means comprises a line sensor disposed on only one side of the stimulable phosphor sheet; and
   wherein the line sensor and the linear light source are disposed on the same side of the stimulable phosphor sheet.

2. A radiation image information recording/reading apparatus as defined in claim 1, wherein the linear light source comprises:
   a laser diode array; and
   a cylindrical lens.

3. A radiation image information recording/reading apparatus as defined in claim 1, wherein a table for supporting an object, said stimulable phosphor sheet and a scan means comprising said linear light source and said line sensor are provided in this order, and the stimulable phosphor sheet is fixed at a predetermined position and the scan means moves along the table.

4. A radiation image information recording/reading apparatus as defined in claim 1, wherein the vertical scan means is located at a position where the vertical scan means does not overlap with the stimulable phosphor sheet at the time of recording the radiation image information.

5. A radiation image information recording/reading apparatus comprising:
   an image recording unit for recording radiation image information in a stimulable phosphor sheet by irradiating radiation representing the radiation image information on the sheet;
   stimulating-ray main scan means for carrying out main scan of the sheet having the radiation image information therein with excitation light irradiated from a side opposite a side of irradiation of the radiation;
   vertical scan means for relatively moving either the stimulable phosphor sheet or the stimulating-ray main scan means to the other in a direction crossing a direction of the main scan;
   photoelectric detection means for detecting phosphorescent light emitted from an area in the sheet on which the excitation light has been irradiated, from a side of irradiation of the excitation light and from a side opposite of the radiation irradiation;
   erasing means for releasing residual radiation energy from the sheet after reading the light, prior to recording of another image in the sheet by the image recording unit;
   a radiation absorption plate placed close to a surface of the sheet on the side opposite of the side of the radiation irradiation at the time of the radiation irradiation on the sheet and moved away from the sheet after the radiation irradiation; and
   a moving device for moving the radiation absorption plate;
   wherein the main scan means comprises a linear light source disposed on only one side of the stimulable phosphor sheet for emitting the excitation light in the form of fan beams, and the photoelectric detection means comprises a line sensor disposed on only one side of the stimulable phosphor sheet;
   wherein the line sensor and the linear light source are disposed on the same side of the stimulable phosphor sheet;
   wherein the stimulable phosphor sheet is a stimulable phosphor sheet having a stimulable phosphor layer and a reflection layer for reflecting the phosphorescent light and
   the stimulable phosphor sheet is scanned with the excitation light in a state where the stimulable phosphor layer is located closer to the excitation light main scan means and the reflection layer is located farther from the excitation light main scan means.

6. A radiation image information recording/reading apparatus as defined in claim 5, wherein
   the stimulable phosphor sheet is an anisotropic stimulable phosphor sheet for restricting spread of the excitation light and/or the phosphorescent light within the sheet.

7. A radiation image information recording/reading apparatus comprising:
   an image recording unit for recording radiation image information in a stimulable phosphor sheet by irradiating radiation representing the radiation image information on the sheet;
   stimulating-ray main scan means for carrying out main scan of the sheet having the radiation image information therein with excitation light irradiated from a side opposite a side of irradiation of the radiation;
   vertical scan means for relatively moving either the stimulable phosphor sheet or the stimulating-ray main scan means to the other in a direction crossing a direction of the main scan;
   photoelectric detection means for detecting phosphorescent light emitted from an area in the sheet on which the excitation light has been irradiated, from a side of irradiation of the excitation light and from a side opposite of the radiation irradiation;
   erasing means for releasing residual radiation energy from the sheet after reading the light, prior to recording of another image in the sheet by the image recording unit;
   a radiation absorption plate placed close to a surface of the sheet on the side opposite of the side of the radiation irradiation at the time of the radiation irradiation on the sheet and moved away from the sheet after the radiation irradiation; and
   a moving device for moving the radiation absorption plate;
   wherein the main scan means comprises a linear light source disposed on only one side of the stimulable phosphor sheet for emitting the excitation light in the form of fan beams, and the photoelectric detection means comprises a line sensor disposed on only one side of the stimulable phosphor sheet;
   wherein the line sensor and the linear light source are disposed on the same side of the stimulable phosphor sheet; and
   wherein the stimulable phosphor sheet is an anisotropic stimulable phosphor sheet for restricting spread of the excitation light and/or the phosphorescent light within the sheet.

* * * * *